(No Model.)
F. W. OSTROM.
STOP MOTION MECHANISM.
No. 352,775. Patented Nov. 16, 1886.
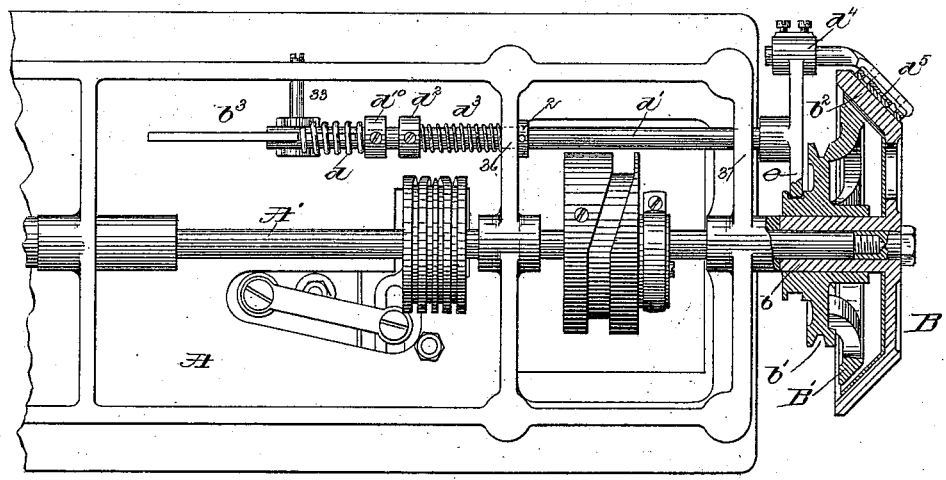
Fig. 2.
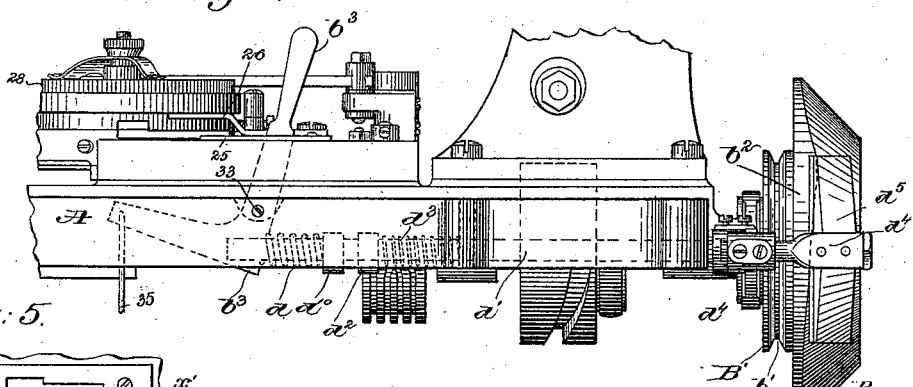
Fig. 1.
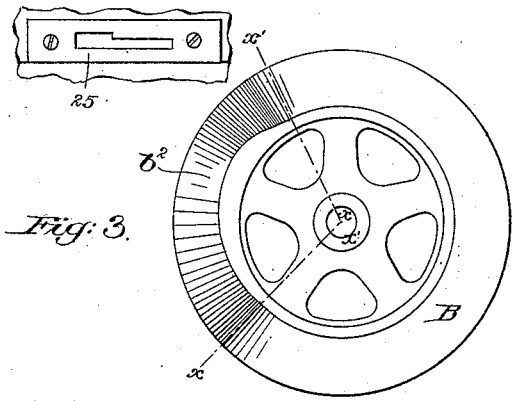
Fig. 5.
Fig. 3.
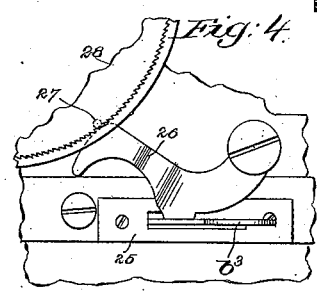
Fig. 4.
Witnesses
Fred L. Emery
Arthur Zipperlen
Inventor
Freeland W. Ostrom
by Crosby & Gregory
atty's

UNITED STATES PATENT OFFICE.

FREELAND W. OSTROM, OF BRIDGEPORT, CONNECTICUT.

STOP-MOTION MECHANISM.

SPECIFICATION forming part of Letters Patent No. 352,775, dated November 16, 1886.

Application filed July 15, 1886. Serial No. 202,049. (No model.)

*To all whom it may concern:*

Be it known that I, FREELAND W. OSTROM, of Bridgeport, county of Fairfield, and State of Connecticut, have invented an Improvement in Stop-Motion Mechanism, of which the following description, in connection with the accompanying drawings, is a specification, like letters on the drawings representing like parts.

This invention has for its object to improve that class of stop-motions wherein a brake is applied to a rotating wheel or disk to enable the brake to stop the said wheel or disk and parts actuated from or through the shaft carrying the said disk or wheel in some predetermined position.

In accordance with my invention the said wheel or disk, attached, preferably, directly to the main shaft of the machine with which the stop-motion is employed, is provided with a cam projection with which co-operates a concaved brake, the said brake fitting upon a convexed cam portion of the rotating wheel or disk, the said brake speedily effecting the stopping of the said wheel or disk.

My invention is herein shown as applied to a sewing-machine, wherein it is desired to frictionally stop the rotation of the main shaft and leave the different parts of the machine in a predetermined position.

Figure 1 in side elevation represents a sufficient portion of a sewing-machine to illustrate one practical application of my invention; Fig. 2, an under side view of Fig. 1, the wheel or disk and friction-hub within it being broken out to show their construction. Fig. 3 is a detail showing the wheel or disk by itself; Fig. 4, a partial top view of Fig. 1 to show the trip-lever and means to hold and release it, and Fig. 5 a detail of the notched holding-plate removed from Fig. 4.

I have herein shown my invention as applied to a sewing-machine, substantially such as illustrated in my patent of the United States No. 303,453, to which reference may be had.

Referring to the drawings, A represents the bed or cloth plate of a sewing-machine, and A' the main shaft. This shaft A', which may be the main shaft of any machine, has fast on it a wheel or disk, B, which in practice forms part of a friction-clutch, the co-operating part of the said clutch being a pulley, B', loosely mounted, preferably upon the sleeve-hub $b$ of the wheel or disk B.

The pulley B' is shown as provided with a groove, $b'$, to receive a driving-belt (not shown) by which to rotate the said pulley continuously from any usual source of power, the said pulley rotating the said wheel or disk B and shaft A' whenever the pulley is forced closely against the wheel or disk, the contacting faces of the said pulley and wheel or disk being preferably made conical, as shown in the drawings.

The wheel or disk B is so shaped as to present a cam-like projection, (marked $b^2$,) it being shown as contained between the lines $x\ x$ and $x'\ x'$, the position of the said cam or projection with relation to the said wheel or disk and the shaft A', and to the position of the brake $d^5$, being such as to insure the stopping of the shaft A' and the parts operated by it in any predetermined positions, as, for instance, in a button-hole-stitching machine, it is a great desideratum to stop the machine with the needle out of the material, and in the case of a machine using a rotary hook, just after the hook has cast off the loop of needle-thread. The brake or shoe $d^5$, concaved at its inner side to fit the convexed surface of the wheel B', is secured to an arm, $d^4$, fast upon a slide, $d'$, having bearings at 36 and 37, and arranged parallel to the shaft A', the said rod being surrounded by a spring, $d^3$, which abuts at one end against the bearing 36, and at its other end against an adjustable collar, $d^2$, fast on the said rod $d'$, the said spring $d^3$ normally acting to keep the brake or shoe $d^5$ pressed toward or against the wheel or disk B; but in practice I desire the said brake or shoe to exert but little, if any, pressure upon the part of the wheel or disk B which is not occupied by the described cam projection $d^2$. To do this I have provided the rod $d'$ with an adjustable collar, 2, which rests against one side of the bearing 36.

As herein shown, the inner end of the rod $d'$ is slotted and surrounded by a spring, $d$, one end of which abuts against an adjustable collar, $d^{10}$, the said spring at its other end being acted upon by a part of the lever $b^3$, pivoted at 33, the said lever entering the slot at the end of the said rod. The lever, connected at one end by a link or chain, 35, attached to any suitable treadle, may be turned so as to compress the spring $d$, which is of greater strength than the spring $d'$, and thus the act of compressing the said spring $d$ will, it will be seen, cause the weaker spring $d^3$ to be first compressed and the rod $d'$ to be moved in the direction to remove the brake or shoe from contact with the wheel or disk B, the said rod in its movements, through the agency of an arm, $e$, attached thereto, entering an annular groove in the hub of the pulley B', causing the conical or friction face thereof to be forced closely into operative engagement with the wheel or disk B, thus effecting its rotation, and with it the shaft A', the force exerted by the spring $d$ when compressed measuring the force by which the pulley and wheel or disk are forced together.

The lever $b^3$, when turned sufficiently to compress the spring $d$ and force the brake or shoe $d^5$ outward from contact with the wheel or disk B, will be caught in a suitable notch of a plate, 25, in or above the bed-plate, the said lever being knocked or pushed out of engagement from the said notch by a lever, 26, acted upon by a pin, 27, of a wheel, 28, whenever it is desired that the spring $d^3$ be left free to move the rod $d'$, and cause the brake or shoe to be put in position to act upon the cam-shaped portion or surface of the said wheel or disk B, and quickly arrest the rotation of the said wheel or disk by acting against the cam surface thereof. The arm $e$ enables the pulley B' to be positively removed from its frictional contact with the said wheel or disk B.

Adjustment of the collars $d^2$ and $d^{10}$ enables me to adjust, respectively, the effective pressure of the brake or shoe upon the cam-surface of the wheel or disk B and the pressure between the pulley B' and the said wheel or disk.

In operation the brake always stops the wheel or disk and the shaft A' at a certain definite point—as, for instance, in a sewing-machine with the needle out of the material.

I have herein shown a spring as the means for forcing the brake or shoe against the cam-shaped periphery of the wheel B'; but I desire it to be understood that while the use of such a spring is desirable and productive of the best results, yet the said spring may be omitted, and in its place I may use a constantly-acting weight or lever by which to move the rod $d'$ in the direction to force the brake or shoe against and so as to stop the rotation of the said wheel B'.

I claim—

1. In a stop-motion mechanism, a rotating shaft and attached wheel or disk provided with a cam projection, substantially as described, combined with a concaved brake or shoe to embrace the said cam projection and stop the rotation of the said wheel frictionally at a predetermined position, substantially as described.

2. In a stop-motion mechanism, a rotating shaft and attached wheel or disk provided with a cam projection, substantially as described, combined with a slide-rod, a brake or shoe, a spring to actuate the said rod to force the brake or shoe against the cam-surface of the said wheel or disk when it is desired to stop the rotation of the said shaft, substantially as described.

3. In a stop-motion mechanism, a rotating shaft, A', a wheel or disk attached thereto and provided with a cam projection, a loose pulley shaped to co-operate with the said wheel or disk to constitute a friction-pulley, a slide-rod provided with a brake or shoe to co-operate with the cam-surface of the wheel or disk, and with a projection to engage and move the said loose pulley, as described, and a latch or lever to hold the brake or shoe out of contact with the said wheel or disk, combined with a spring to move the said slide-rod to bring the said brake or shoe against the cam-surface of the said wheel or disk when the latch or lever is released, substantially as described.

4. In a stop-motion mechanism, a rotating shaft, A', a wheel or disk attached thereto and provided with a cam projection, a loose pulley shaped to co-operate with the said wheel or disk to constitute a friction-pulley, a slide-rod provided with a brake or shoe to co-operate with the cam-surface of the wheel or disk, and with a projection to engage and move the said loose pulley, as described, and a collar or projection to limit the movement of the said rod parallel to the shaft A', and the movement of the brake or shoe toward the wheel or disk, combined with a spring to force the said brake or shoe against the cam projection of the said wheel or disk, substantially as described.

In testimony whereof I have signed my name to this specification in the presence of two subscribing witnesses.

FREELAND W. OSTROM.

Witnesses:
  G. W. GREGORY,
  I. H. CHURCHILL.